United States Patent
Tzeng

(10) Patent No.: US 9,021,186 B2
(45) Date of Patent: *Apr. 28, 2015

(54) PARTIAL ALLOCATE PAGING MECHANISM USING A CONTROLLER AND A BUFFER

(71) Applicant: Spansion LLC, Sunnyvale, CA (US)

(72) Inventor: Tzungren Tzeng, San Jose, CA (US)

(73) Assignee: Spansion LLC, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/709,479

(22) Filed: Dec. 10, 2012

(65) Prior Publication Data

US 2013/0124789 A1 May 16, 2013

Related U.S. Application Data

(63) Continuation of application No. 12/026,302, filed on Feb. 5, 2008, now Pat. No. 8,352,671.

(51) Int. Cl.
*G06F 13/00* (2006.01)
*G06F 12/02* (2006.01)

(52) U.S. Cl.
CPC .... *G06F 12/0246* (2013.01); *G06F 2212/7203* (2013.01); *G06F 2212/7211* (2013.01)

(58) Field of Classification Search
CPC ............... G06F 12/0866; G06F 12/08; G06F 2212/222; G06F 3/0685; G06F 11/1068; G06F 12/0893; G06F 2212/2022; G06F 3/0656
USPC .............................. 711/103, 118, 165; 710/36
See application file for complete search history.

(56) References Cited

U.S. PATENT DOCUMENTS

| | | | |
|---|---|---|---|
| 5,297,148 A | 3/1994 | Harari et al. | |
| 5,388,248 A | 2/1995 | Robinzon et al. | |
| 5,946,714 A | 8/1999 | Miyauchi | |
| 6,000,006 A | 12/1999 | Bruce et al. | |
| 6,081,447 A | 6/2000 | Lofgren et al. | |
| 6,145,055 A | 11/2000 | Fujimoto | |
| 6,272,052 B1 | 8/2001 | Miyauchi | |
| 6,418,506 B1* | 7/2002 | Pashley et al. | 711/103 |
| 6,457,075 B1 | 9/2002 | Koutsoures | |
| 6,564,286 B2 | 5/2003 | DaCosta | |
| 6,795,890 B1* | 9/2004 | Sugai et al. | 711/103 |
| 6,910,106 B2 | 6/2005 | Sechrest et al. | |
| 6,938,116 B2 | 8/2005 | Kim et al. | |
| 7,120,729 B2 | 10/2006 | Gonzalez et al. | |
| 7,353,324 B2 | 4/2008 | Tanaka | |
| 7,564,722 B2 | 7/2009 | Klein | |

(Continued)

OTHER PUBLICATIONS

Non-Final Office Action dated Feb. 25, 2013 for U.S. Appl. No. 13/590,294, 32 pages.

(Continued)

*Primary Examiner* — Hong Kim
(74) *Attorney, Agent, or Firm* — Amin, Turocy & Watson, LLP

(57) ABSTRACT

A memory system is provided. The system includes a controller that regulates read and write access to one or more FLASH memory devices that are employed for random access memory applications. A buffer component operates in conjunction with the controller to regulate read and write access to the one or more FLASH devices. Wear leveling components along with read and write processing components are provided to facilitate efficient operations of the FLASH memory devices.

20 Claims, 15 Drawing Sheets

(56) References Cited

U.S. PATENT DOCUMENTS

| | | | |
|---|---|---|---|
| 7,610,445 | B1 | 10/2009 | Manus et al. |
| 8,352,671 | B2 * | 1/2013 | Tzeng ............................ 711/103 |
| 2002/0065988 | A1 | 5/2002 | Lasserre et al. |
| 2002/0107835 | A1 | 8/2002 | Coram et al. |
| 2002/0188806 | A1 | 12/2002 | Rakvic et al. |
| 2004/0105303 | A1 * | 6/2004 | Fukuzumi ..................... 365/158 |
| 2004/0193782 | A1 * | 9/2004 | Bordui ......................... 711/103 |
| 2005/0068802 | A1 * | 3/2005 | Tanaka ......................... 365/145 |
| 2005/0185472 | A1 * | 8/2005 | Randell et al. ............ 365/185.33 |
| 2005/0195635 | A1 | 9/2005 | Conley et al. |
| 2006/0195661 | A1 | 8/2006 | Hu et al. |
| 2006/0221756 | A1 | 10/2006 | Miura et al. |
| 2006/0224789 | A1 * | 10/2006 | Cho et al. ....................... 710/52 |
| 2007/0016799 | A1 | 1/2007 | Klint et al. |
| 2007/0079065 | A1 | 4/2007 | Bonella et al. |
| 2007/0091678 | A1 * | 4/2007 | Kato et al. ................ 365/185.09 |
| 2007/0208904 | A1 | 9/2007 | Hsieh et al. |
| 2007/0233941 | A1 | 10/2007 | Lee et al. |
| 2007/0283428 | A1 | 12/2007 | Ma et al. |
| 2007/0288683 | A1 * | 12/2007 | Panabaker et al. ............. 711/101 |
| 2008/0016267 | A1 | 1/2008 | Oyaizu |
| 2008/0091872 | A1 | 4/2008 | Bennett et al. |
| 2008/0155183 | A1 | 6/2008 | Zhuang et al. |
| 2008/0162786 | A1 | 7/2008 | Shanmuganathan |
| 2008/0189452 | A1 | 8/2008 | Merry et al. |
| 2008/0209108 | A1 * | 8/2008 | Pyeon et al. ................... 711/103 |
| 2008/0215802 | A1 | 9/2008 | Chow et al. |
| 2008/0313505 | A1 | 12/2008 | Lee et al. |
| 2009/0198872 | A1 | 8/2009 | Tzeng |
| 2009/0204872 | A1 | 8/2009 | Yu et al. |

OTHER PUBLICATIONS

Non-Final Office Action dated Mar. 20, 2013 for U.S. Appl. No. 13/670,910, 25 pages.
OA dated Feb. 28, 2011 for U.S. Appl. No. 12/026,296, 21 pages.
OA dated Jun. 17, 2010 for U.S. Appl. No. 12/026,296, 23 pages.
OA dated Oct. 8, 2010 for U.S. Appl. No. 12/026,299, 25 pages.
OA dated Feb. 18, 2011 for U.S. Appl. No. 12/026,299, 20 pages.
OA dated Jul. 20, 2010 for U.S. Appl. No. 12/026,362, 26 pages.
OA dated Feb. 28, 2011 for U.S. Appl. No. 12/026,362, 14 pages.
OA dated Jul. 12, 2011 for U.S. Appl. No. 12/026,296, 21 pages.
OA dated May 25, 2011 for U.S. Appl. No. 12/026,299, 22 pages.
OA dated Aug. 5, 2011 for U.S. Appl. No. 12/026,362, 22 pages.
OA dated Nov. 29, 2011 for U.S. Appl. No. 12/026,296, 23 pages.
OA dated Oct. 19, 2011 for U.S. Appl. No. 12/026,299, 19 pages.
OA dated Dec. 19, 2011 for U.S. Appl. No. 12/026,362, 29 pages.
Notice of Allowance dated Feb. 28, 2012 for U.S. Appl. No. 12/026,296, 19 pages.
OA dated Jul. 2, 2012 for U.S. Appl. No. 12/026,299, pp. 8.
OA dated Oct. 28, 2010 for U.S. Appl. No. 12/026,302, 26 pages.
OA dated Feb. 28, 2011 for U.S. Appl. No. 12/026,302, 16 pages.
OA dated Jul. 20, 2011 for U.S. Appl. No. 12/026,302, 19 pages.
OA dated Dec. 14, 2011 for U.S. Appl. No. 12/026,302, 18 pages.
OA dated Apr. 24, 2012 for U.S. Appl. No. 12/026,302, 27 pages.
Office Action dated Oct. 3, 2013 for U.S. Appl. No. 13/590,294, 20 pages.
Office Action dated Jun. 14, 2013 for U.S. Appl. No. 13/590,294, 18 pages.
Office Action dated Sep. 5, 2013 for U.S. Appl. No. 13/670,910, 53 pages.
Notice of Allowance dated Feb. 3, 2014 for U.S. Appl. No. 13/590,294, 20 pages.

* cited by examiner

PARTIAL ALLOCATE PAGING MECHANISM USING A CONTROLLER AND A BUFFER

CROSS-REFERENCE TO RELATED APPLICATIONS

This application is a Continuation of, and claims priority to, U.S. Pat. No. 8,352,671 issued on Jan. 8, 2013, the entire contents of which is hereby incorporated herein by reference.

TECHNICAL FIELD

The subject innovation relates generally to memory systems and in particular to systems and methods that employ FLASH memory technology in lieu of conventional DRAM memory subsystems.

BACKGROUND

A wide variety of memory devices can be used to maintain and store data and instructions for various computers and similar systems. In particular, flash memory is a type of electronic memory media that can be rewritten and that can retain content without consumption of power. Unlike dynamic random access memory (DRAM) devices and static random memory (SRAM) devices in which a single byte can be erased, flash memory devices are typically erased in fixed multi-bit blocks or sectors. Flash memory technology can include NOR flash memory and/or NAND flash memory, for example. Flash memory devices typically are less expensive and denser as compared to many other memory devices, meaning that flash memory devices can store more data per unit area.

Flash memory has become popular, at least in part, because it combines the advantages of the high density and low cost of EPROM with the electrical erasability of EEPROM. Flash memory is nonvolatile; it can be rewritten and can hold its content without power. It can be used in many portable electronic products, such as cell phones, portable computers, voice recorders, thumbnail drives and the like, as well as in many larger electronic systems, such as cars, planes, industrial control systems, etc. The fact that flash memory can be rewritten, as well as its retention of data without a power source, small size, and light weight, have all combined to make flash memory devices useful and popular means for transporting and maintaining data.

Typically, when data is stored in a physical location (e.g., physical block address (PBA)) in a memory device, a system block address (LBA) can be associated with the data to facilitate retrieval of the data from the memory by a host. An address translation table can be used to store the translations of LBAs to the PBAs. When the host requests data from or desires to write data to a particular LBA, the address translation table can be accessed to determine the PBA that is associated with the LBA. The LBA associated with the data can remain the same even if the PBA where the data is stored changes. For example, a block of memory containing the PBA can have antiquated data in other memory locations in the block. The block of memory can be erased to reclaim the block, and valid data stored in the block, including the data in the PBA, can be moved to new physical locations in the memory. While the PBA of the data is changed, the LBA can remain the same. The address translation table can be updated to associate the new PBA with the LBA.

Conventionally, when a host processor desires to access a memory location the host processor can send a command to the memory that specifies the LBA the host processor wants to access. The LBA can be mapped to a PBA where the PBA will be used to actually address the DRAM or FLASH memory.

In conventional computing systems, DRAM technology has typically been employed to operate the dynamic memory of the computer in order for an application to operate at high speeds. Slower speed memories such as hard drives and FLASH technology have been utilized for non-volatile long term storage requirements. As previously noted, FLASH provides lower power consumption with higher density capability per package size than DRAM. It would be desirable if some of the advantages of FLASH technology could be exploited to support many of the applications that are currently running with DRAM technology. Unfortunately, there currently are bandwidth issues with FLASH that would not allow for a direct substitution with existing DRAM applications.

SUMMARY

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

Systems and methods are provided that enable FLASH memory technologies to be utilized for existing DRAM applications in computer memory subsystems. Various components and processes are provided to facilitate timing and other component differences between existing DRAM applications and FLASH capabilities. In one aspect, an expansion slot is employed to provide additional FLASH capability for a computer, where the slot is controlled by an application specific integrated circuit (ASIC) that controls timing to the FLASH. A buffer area of DRAM is maintained to process high speed write requirements and allow slower memory updates to the FLASH during background operations that occur over time. In order to prevent any one sector of FLASH from becoming worn over time, wear leveling mechanisms are provided that re-map one sector of FLASH to another. In one aspect, a DRAM buffer provides a temporary storage area for files to be moved from one memory location to another. In other aspects, operating system enhancements can allow free list mechanisms to be utilized for management of memory wear. In yet another aspect, DRAM buffers are sized appropriately for given applications and to account for nuances of FLASH timing requirements. This includes sizing the DRAM buffer greater than expected needs for an existing application. If the change rate of application memory is slower than the time to update FLASH, then enable moving contents of the buffer at suitable times. If an application employs bursting behavior where data is not written to memory very often but a high rates of speed, the buffer can be employed to capture the burst and then move the data to FLASH over time. In yet another aspect, read bandwidth issues after an application memory write are considered. Write data for an application of the page from FLASH may be partially allocated to DRAM while not completely copying the associated data for the application from FLASH. The partially allocated data is then read from DRAM and written to FLASH when the respective DRAM page is moved to flash.

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and distinctive features of the disclosed subject matter will become apparent from the following detailed description of the innovation when considered in conjunction with the drawings.

DETAILED DESCRIPTION

Systems and/or methods are presented that facilitate usage of FLASH memory technologies in place of conventional DRAM subsystems. In one aspect, a memory system is provided. The system includes a controller that regulates read and write access to one or more FLASH memory devices that are employed for random access memory applications. A buffer component operates in conjunction with the controller to regulate read and write access to the one or more FLASH devices. Wear leveling components along with read and write processing components are provided to facilitate efficient operations of the FLASH memory devices.

Figure 1:
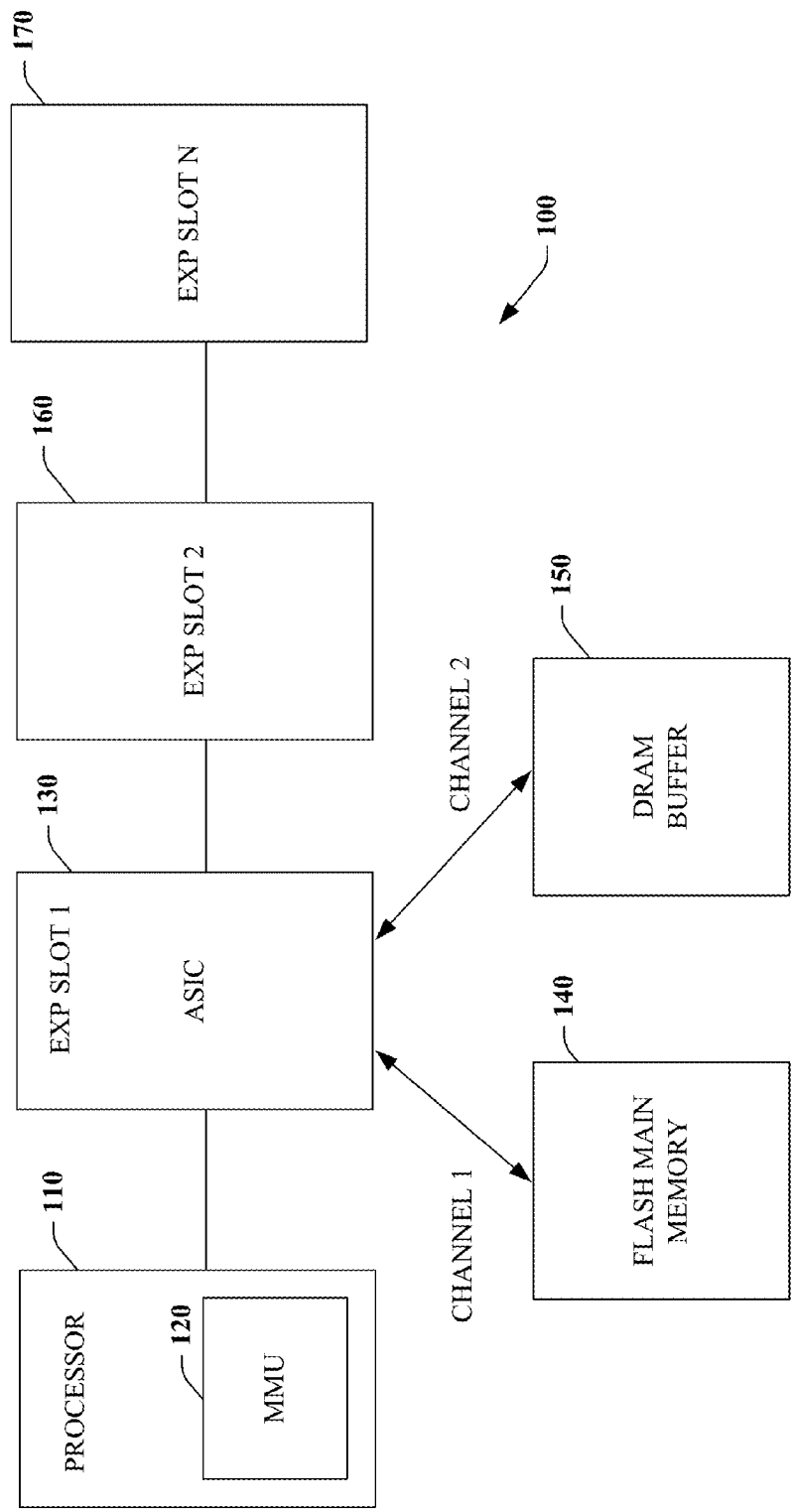
FIG. 1 illustrates a block diagram of a FLASH memory architecture employed for random access memory applications.

Referring initially to FIG. 1, a system 100 illustrates a FLASH memory architecture that is employed to support random access computer memory applications. The system 100 includes a processor 110 having a memory management unit (MMU) 120 that controls data flows into and out of the processor. An application specific integrated circuit (ASIC) 130 occupies an expansion slot and communicates to a FLASH component 140 and a DRAM buffer 150. As shown, one or more other slots 160 and 170 can be provided. In general, the processor 110 supports traditional DRAM data flows and timing, where in order to employ the FLASH component 140, the ASIC 130 provides controlled access to the FLASH component. Control includes read and write timing to the FLASH component 140 along with consideration of wear leveling to any particular sector of the FLASH. The DRAM buffer 150 allows temporary high speed access while background operations or other processes may be employed to transfer contents of the buffer to FLASH. The buffer can also be used for a temporary copy area to allow one area of FLASH to be re-mapped to another location of FLASH to mitigate wear in a given memory location.

In general, the processor 110 can communicate with each of the expansion slots 130, 160, and 170, where each slot can communicate with two or more channels. The ASIC 130 employs one channel (or more) to communicate with the FLASH component 140 and another channel (or more) to communicate with the DRAM buffer 150. As data from an application is written into the temporary DRAM buffer 150, it can be moved to the FLASH 140 during background operations or in accordance with other procedures described in more detail below. In an alternative aspect, an operating system (not shown) can be modified to recognize the FLASH component 140/DRAM Buffer 150 and thus employ the MMU 120 to update the FLASH from the DRAM buffer. The ASIC 130 basically controls or provides a controlled access in accordance with timing of the FLASH component 140. As can be appreciated, the expansion slots can be employed in various aspects. This include providing additional ASIC/memory expansion, providing additional FLASH capability of adding additional buffer memory. Memory can be configured as a dual inline memory module (DIMM) for the ASIC, FLASH, and/or DRAM buffer respectively. Thus, the expansion slots can be used to provide more ASIC capabilities, more FLASH capabilities, and/or more DRAM buffer capability. It is to be appreciated that dual in line memory module configurations are but one of many possible configurations and that substantially any type of packaging arrangement for FLASH and/or DRAM are possible.

The system 100 can include one or more memory components that can be comprised of a non-volatile memory (e.g., flash memory) and/or volatile memory (e.g., random access memory (RAM)). The memory components can receive information, including data, commands, and/or other information, which can be processed (e.g., store data, execute commands, etc.). The memory components can include a memory array that can receive and store data. The memory array can include a plurality of memory cells wherein each memory cell can store one or more bits of data. Data stored in a memory cell(s) in the memory array can be read and such data can be provided as an output, or can be erased from the memory cell(s) in accordance with the timing and wear considerations of the FLASH component 140.

Conventionally, when data is desired from a memory (e.g., flash memory), a host processor 130 can issue a command to the memory, where the memory command can include information regarding the particular memory device and a particular block, where the data can be stored on a page within the block. The memory can load a page from that block into a buffer (e.g., page buffer), where typically there can be multiple loads in order to load the page. In one aspect, the memory array can be comprised of a predetermined number of blocks, where a block can be the minimum portion of the memory component (e.g., flash memory) that can be erased and programmed during an erase operation.

Figure 2:
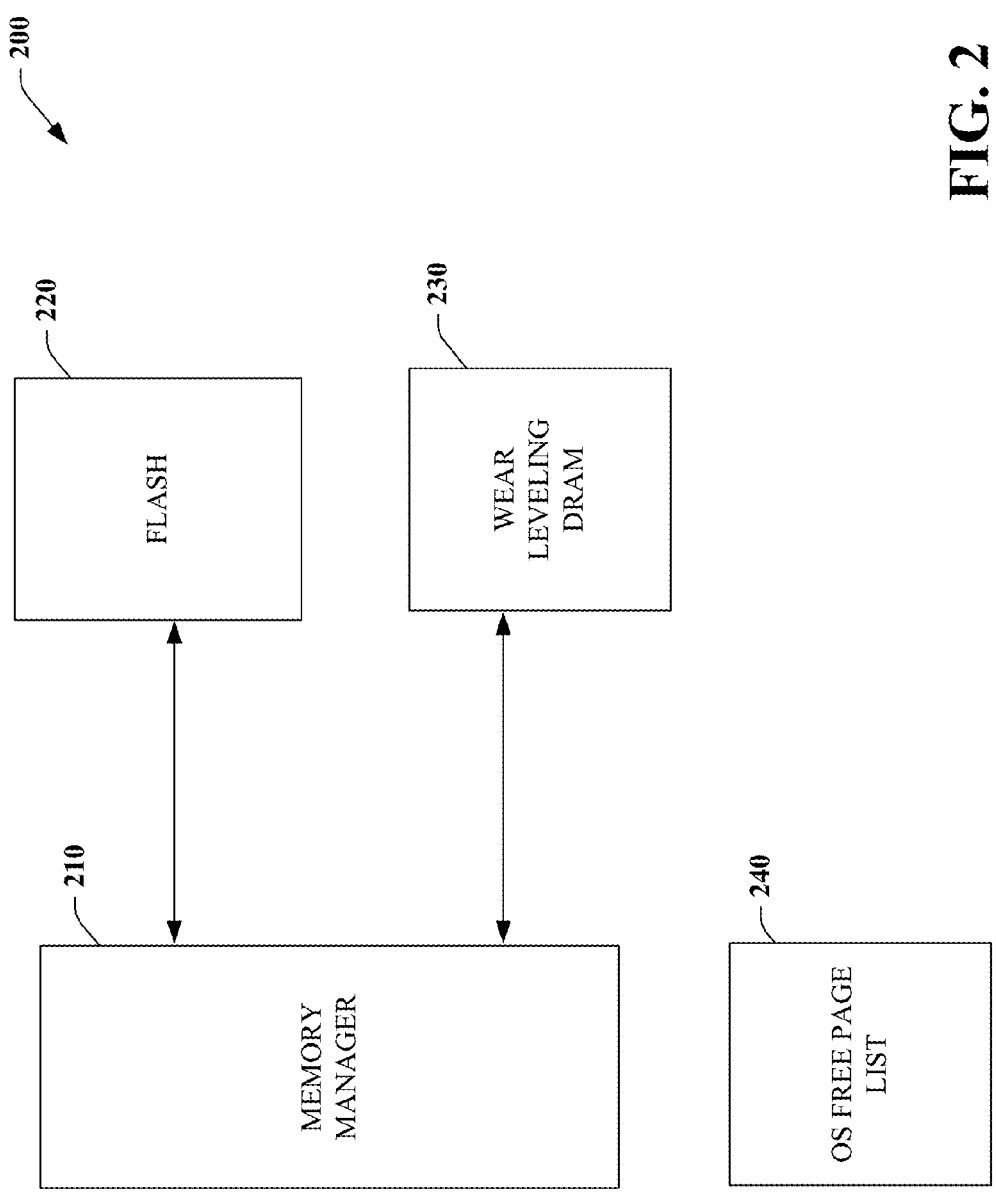
FIG. 2 depicts a block diagram of a wear leveling system for FLASH memory.

Turning to FIG. 2, a system 200 illustrates wear leveling concepts for FLASH memory devices. In this aspect, consideration is given to the concept that FLASH devices can wear out over time if the same memory addresses are always employed. Conventionally, FLASH memories were managed similar to a disk where a file system for memory management is used. The operating system communicates with the file system which informs about deleting or adding of files to the memory. The file system is aware of unmapped or free sectors within FLASH memory. When wear leveling is applied, a frequently written sector is de-mapped and replaced by an infrequently written sector. From the free sector pool. For a completely full memory, this process can be entirely inefficient in that swapping of sectors can take up to two program writes and corresponding erase procedures.

The system 200 illustrates different operations to perform wear leveling in a FLASH based random access system. As shown, a memory manager 210 communicates with a FLASH memory 220. An additional DRAM buffer 230 is provided that is not visible to the main memory/operating system architecture. The DRAM buffer 230 is employed as a temporary storage area to allow re-mapping of lightly used FLASH addresses with more heavily used areas of FLASH. Thus, the DRAM buffer is only visibly to the memory manager 210 and employed as a data exchange area for areas of FLASH memory that are heavily used. The spare capacity provided by the DRAM buffer 230 provides sector swap capabilities to facilitate wear leveling across the FLASH 220. In an alternative aspect, operating system software can be modified to provide a free list component 240. The operating system can inform an ASIC or other controller of areas of random access memory that are considered free and not currently in use by one or more applications. Such free list areas can be employed in lieu of the DRAM buffer 230 for wear leveling. As can be appreciated, a combination of DRAM buffer 230 and the free list component 240 could also be employed to perform wear leveling. It is noted that various counters can be maintained to track what sectors have been used and to determine when to perform wear leveling in the system e.g., threshold counter levels to determine when to swap highly used sectors with lightly used ones.

Figure 3:
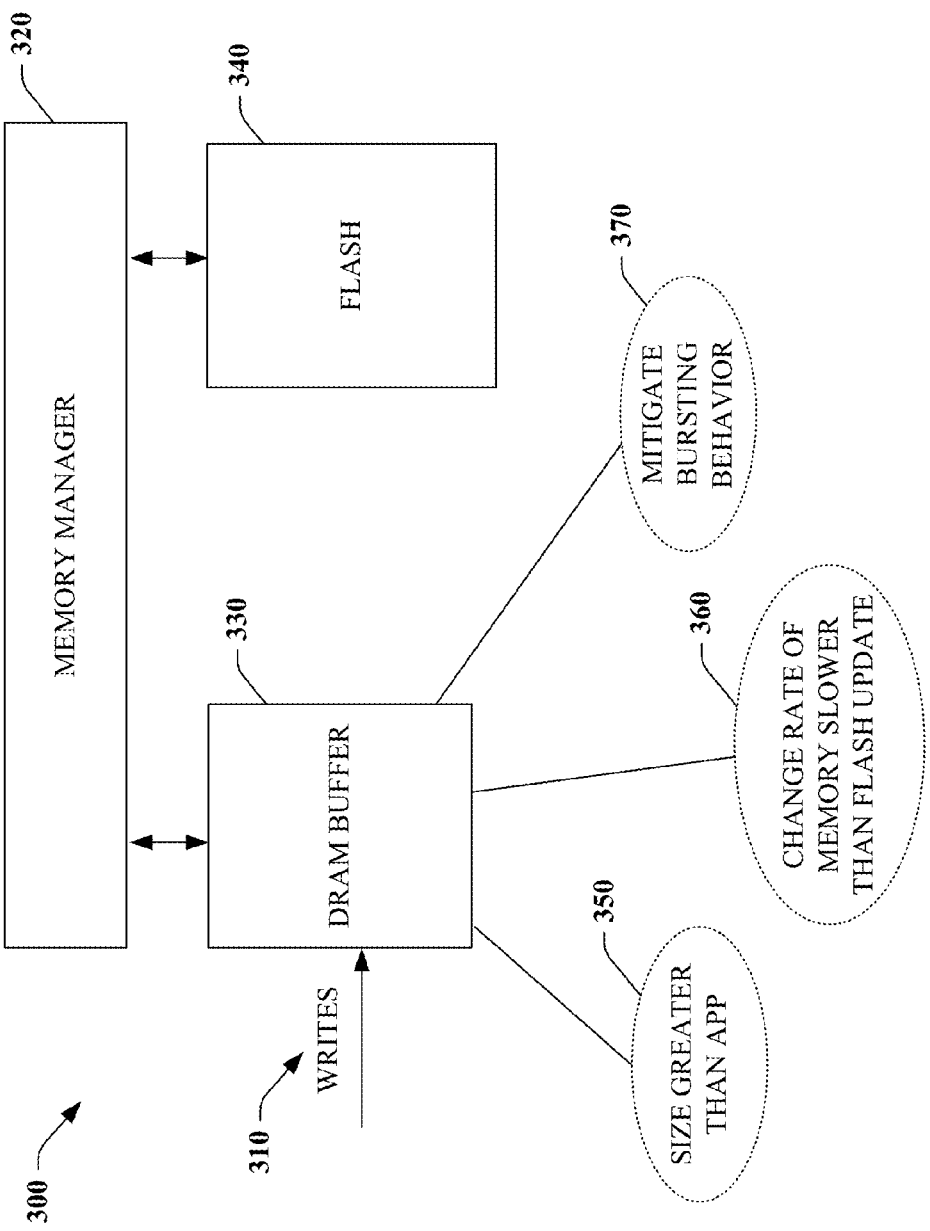
FIG. 3 is a block diagram depicting DRAM sizing and FLASH write considerations.

Referring now to FIG. 3, a system 300 illustrates write timing access. As shown, write data 310 is controlled by a memory manager 320. The write data can be captured by a DRAM buffer 330 and subsequently moved to a FLASH memory 340 over time such as background operations of a process or thread. By moving the write data 310 over time, the slower write times for the FLASH can be accommodated. In general, the DRAM buffer 330 can be sized differently depending on application considerations. In one aspect, at 350, the DRAM 330 is sized such that it can temporarily hold data for any working set of a given application. In another aspect at 360, if the change rate of the write working set to the DRAM buffer 330 is slower than the update rates to the FLASH 340, then even though the application can demand a much higher bandwidth than the flash can offer, such application can still execute efficiently on the system.

In yet another aspect, bursting behavior is considered at 370. Here, data to be written may not change all that often but when data is written, it is written at a high rate over a short period of time. In this case, the DRAM 330 can be employed to capture the high data rate and use background operations to spread that rate out over time. In other cases, operating system behavior can be modified to mitigate bursts such that data that is updated infrequently can be written over a longer period of time. Generally, data is written to the FLASH in chunks of sectors. Thus, typically at least one sector is cached in the DRAM before subsequently updating the FLASH.

Figure 4:
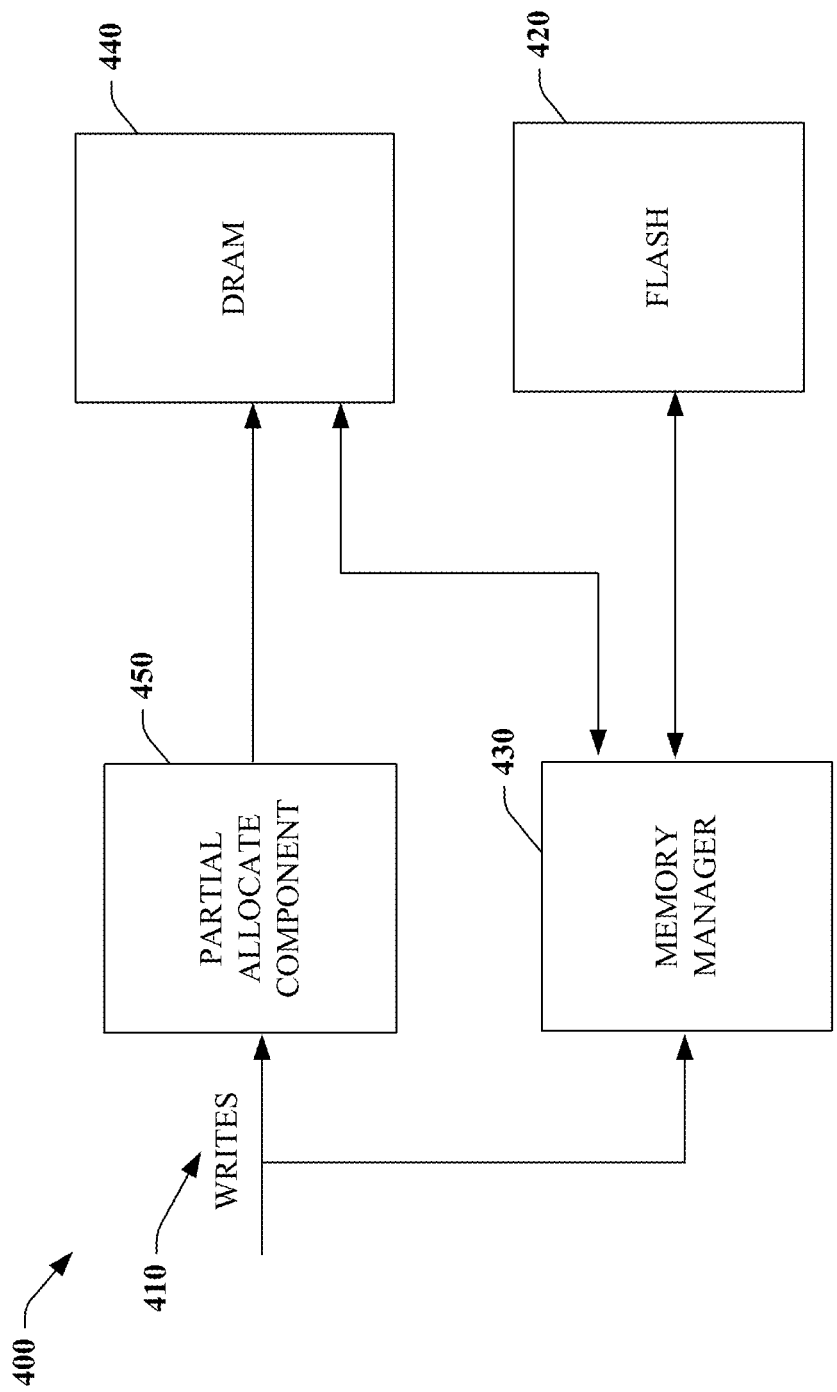
FIG. 4 illustrates a block diagram of a system that partially allocates contents from FLASH to mitigate system bus activity.

Referring now to FIG. 4, read and write bandwidth consideration issues are discussed for FLASH memory updates. As discussed above, write data 410 to a FLASH 420 is typically controlled by an ASIC performing a memory manager function 430 that controls timing to the FLASH. In order to mitigate system bandwidth from slowing down (e.g., copying from FLASH to buffer and vice versa), it is also desirable to mitigate how often contents of the FLASH 420 are copied into a temporary DRAM storage area 440. In conventional architectures, it is typical to copy all the contents for an application into working memory such as paging in from a disk. In this case, a partial allocation function 450 is written where a small section of the FLASH 420 is copied into the DRAM 440 and updated with the corresponding write data 410 from the application. If the application needs to read data, the small sector that has been updated can be read from the DRAM 440 and the rest of the application data that was not copied can be read from FLASH.

Over time or after the page is no longer used, the updated write contents of the DRAM can be transferred into the FLASH 420 as previously described above. The partial allocate function 450 operates over incoming write requests that are written to DRAM pages. Other non-modified data is not brought into the DRAM from the FLASH 420 thus conserving the number of read and write cycles on the system bus. The modified page can stay in DRAM 440 as long as needed. Before proceeding, it is noted that FIGS. 5-16 are provided as but one example of an implementation for the concepts described above. It is to be appreciated that other examples are possible.

Figure 5:
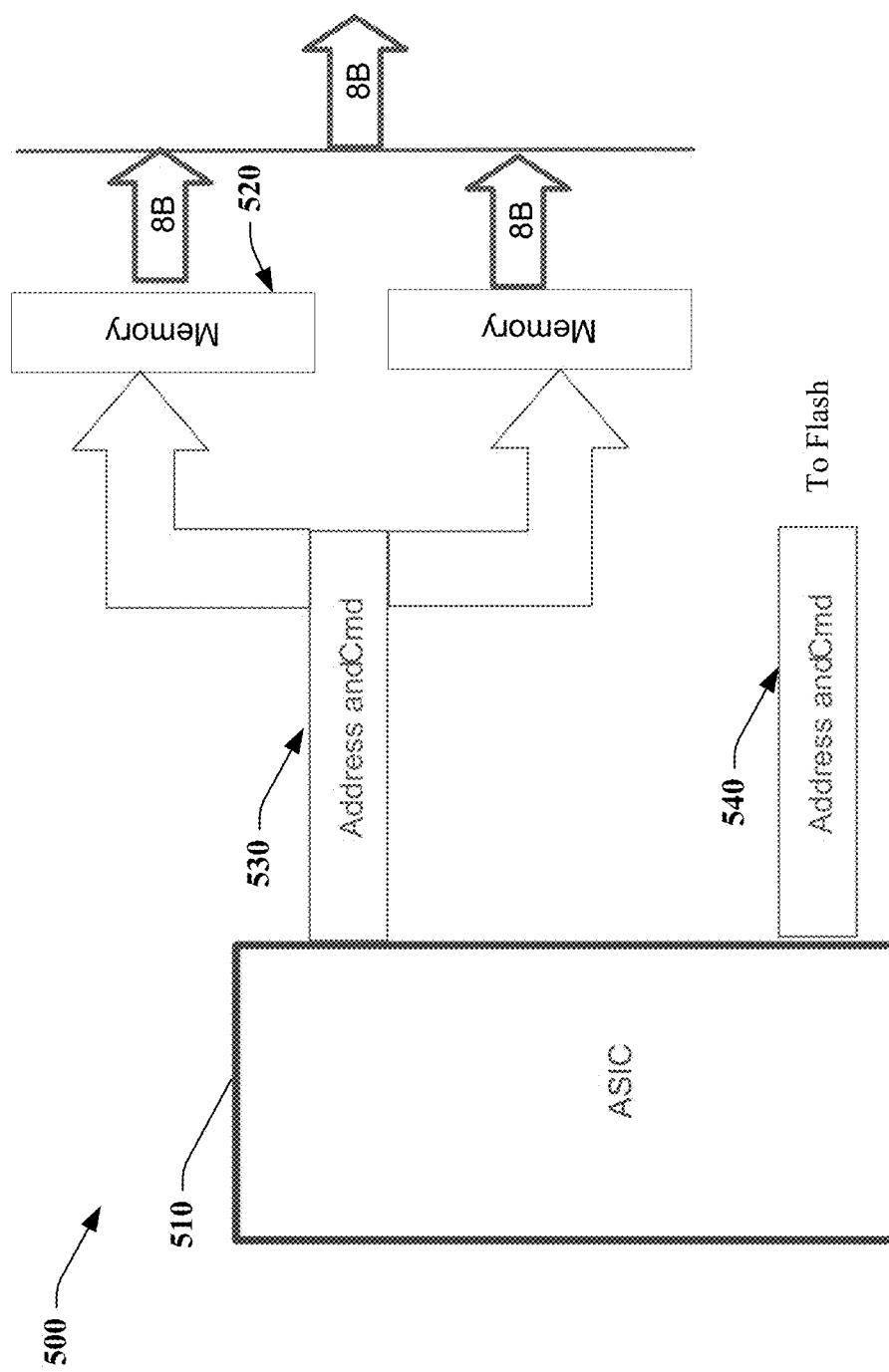
FIGS. 5 and 6 depicts example FLASH subsystems that employ DRAM buffers to facilitate FLASH interface requirements.
Figure 6:
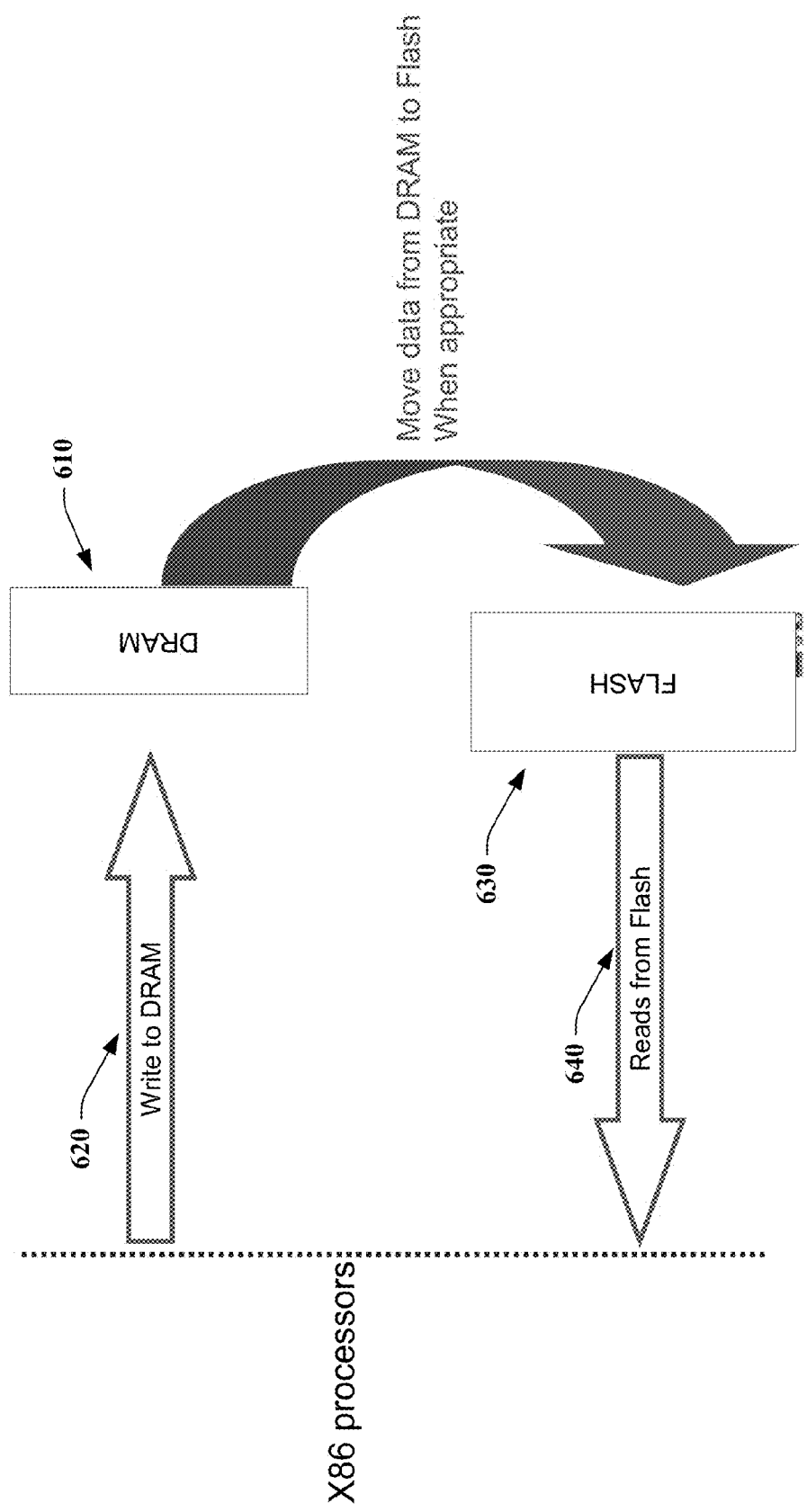

FIG. 5 illustrates a dual channel memory architecture 500. As shown, an ASIC 510 communicates with a buffer memory of dynamic data ram (DDR) dual inline memory (DIMM) modules at 520 and over a first channel of address and command at 530. A second channel 540 communicates with FLASH memory in a DIMM configuration. The DIMM 520 is used as a temporary buffer for the FLASH and to facilitate such functions as wear leveling. Similarly, FIG. 6 shows DRAM data 610 which is mainly received as write data 620 from a central processor and transferred to FLASH at 630 and subsequently read from FLASH at 640.

In general, the DRAM serves as the write data staging area for incoming system writes. Thus, it holds frequently written pages/sector in DRAM as long as possible if there is enough room in DRAM. The buffer stores the same number of page entries as the number of pages in DRAM. This can include using associativity to minimize conflict misses. Such mechanisms can be bypassed via configuration register set up for applications that have low write demand and have larger write working sets.

Figure 7:
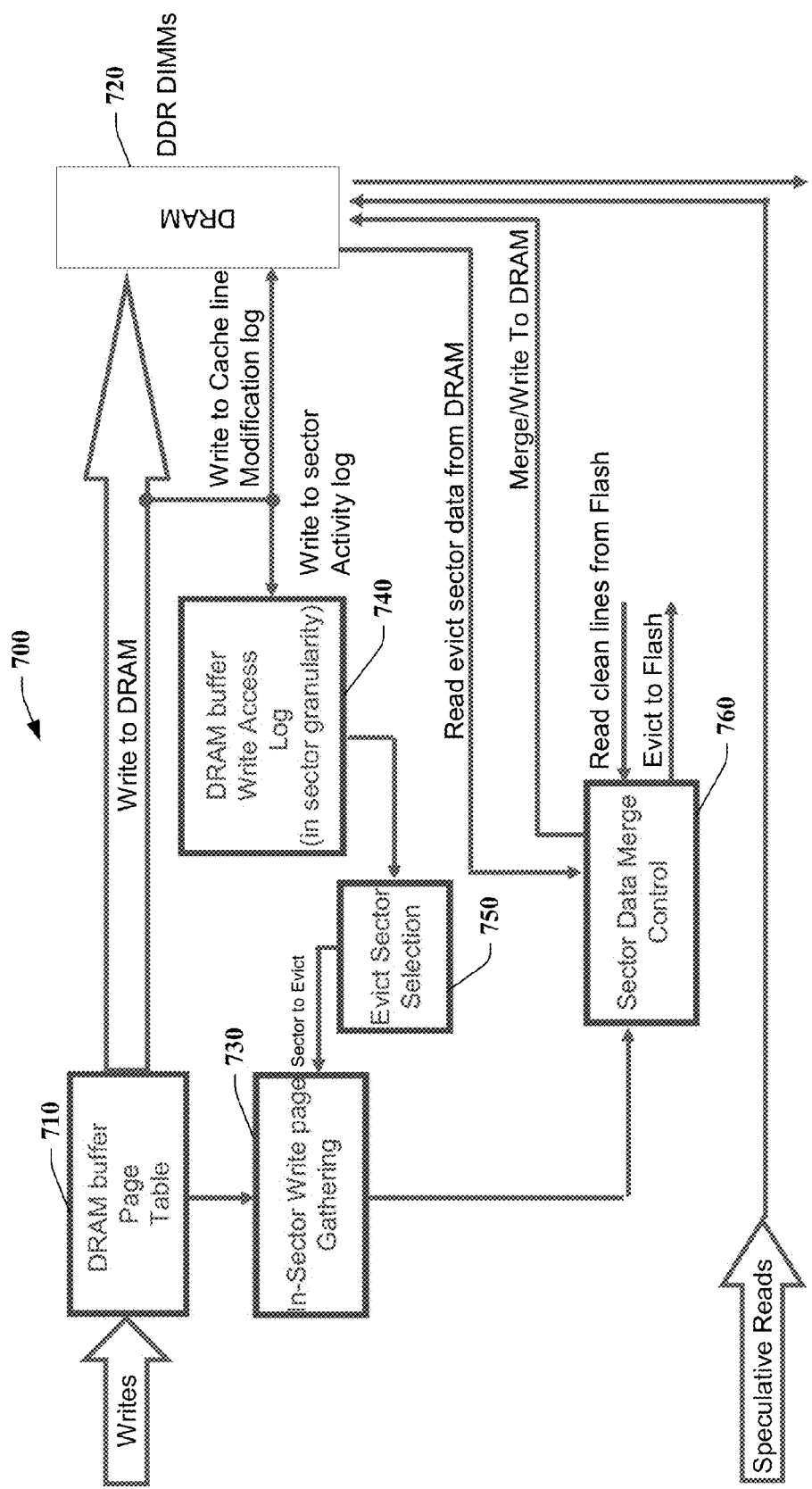
FIG. 7 illustrates a block diagram of an example DRAM buffer management system.

Referring to FIG. 7, an example DRAM management system 700 is illustrated. The system 700 includes a DRAM buffer page table 710 that updates one or more DRAM DIMM's 720 and writes to an in-sector write page gathering component 730. Other components include write access log for monitoring DRAM wear and access and an evict sector control 750. A sector data merge control 760 facilitates moving data to and from the buffer and the FLASH, respectively.

Some other aspects to consider include setting limits on the amount of DRAM e.g., 4 GB maximum. Other aspects include processing In-coming Writes from the processor are of the size 64 B but other sizes can be employed. One sector (in this context is 128 kB*8 devices) equals to 1 MB. Sector based write activity log based on frequency and time of Writes in the past. This log can be used by replacement algorithm chosen to decide which sector to be evicted to flash. The DRAM is typically managed by the DRAM buffer page table 710 organized as 256 k page translation entries with 16 kB page size. A 1 MB sector can have 64 "DRAM buffer pages" for example. When a sector is chosen for eviction, the possible pages within the sector can be evicted from the DRAM and the corresponding "DRAM buffer page table" entry cleared. Page data can be moved from DRAM to Flash in a background operation except when a page or sector is still frequently written or DRAM is exhausted. A Watermark mechanism combined with a system bus with data back throttling can be provided to facilitate no write operation is dropped.

Figure 8:
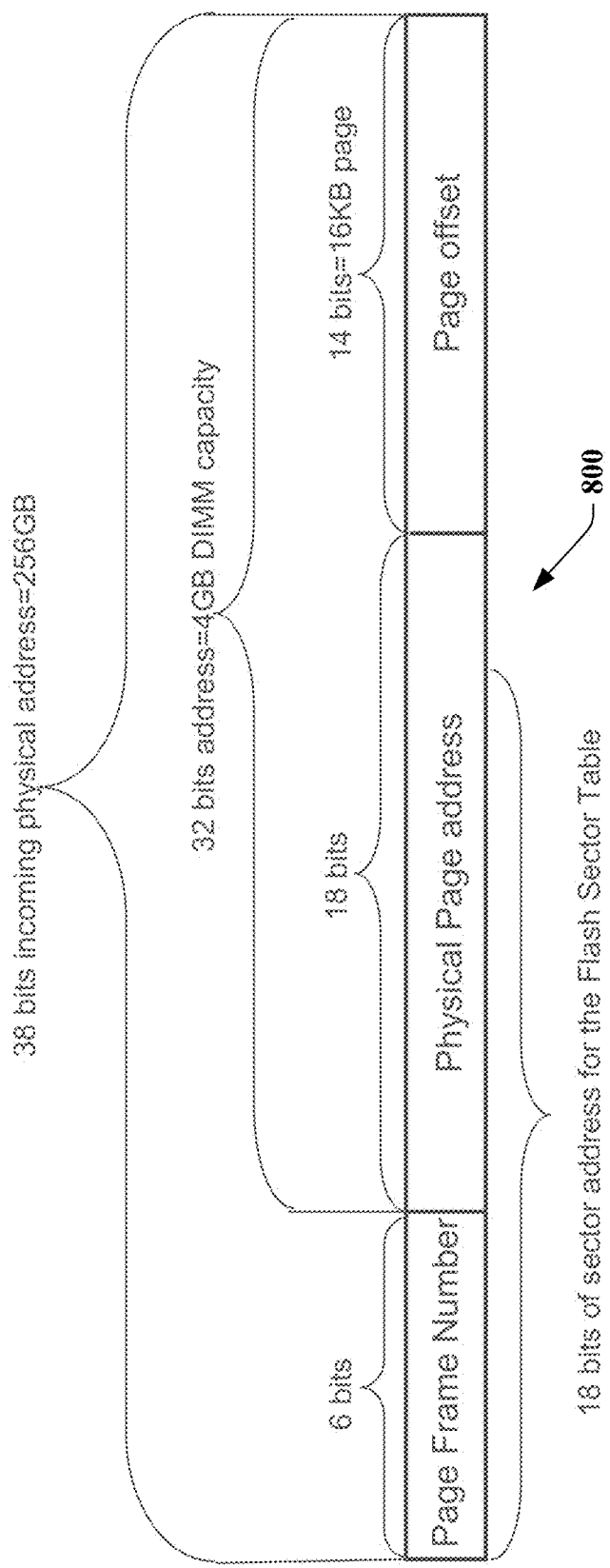
FIGS. 8 and 9 depict example addressing formats.
Figure 9:
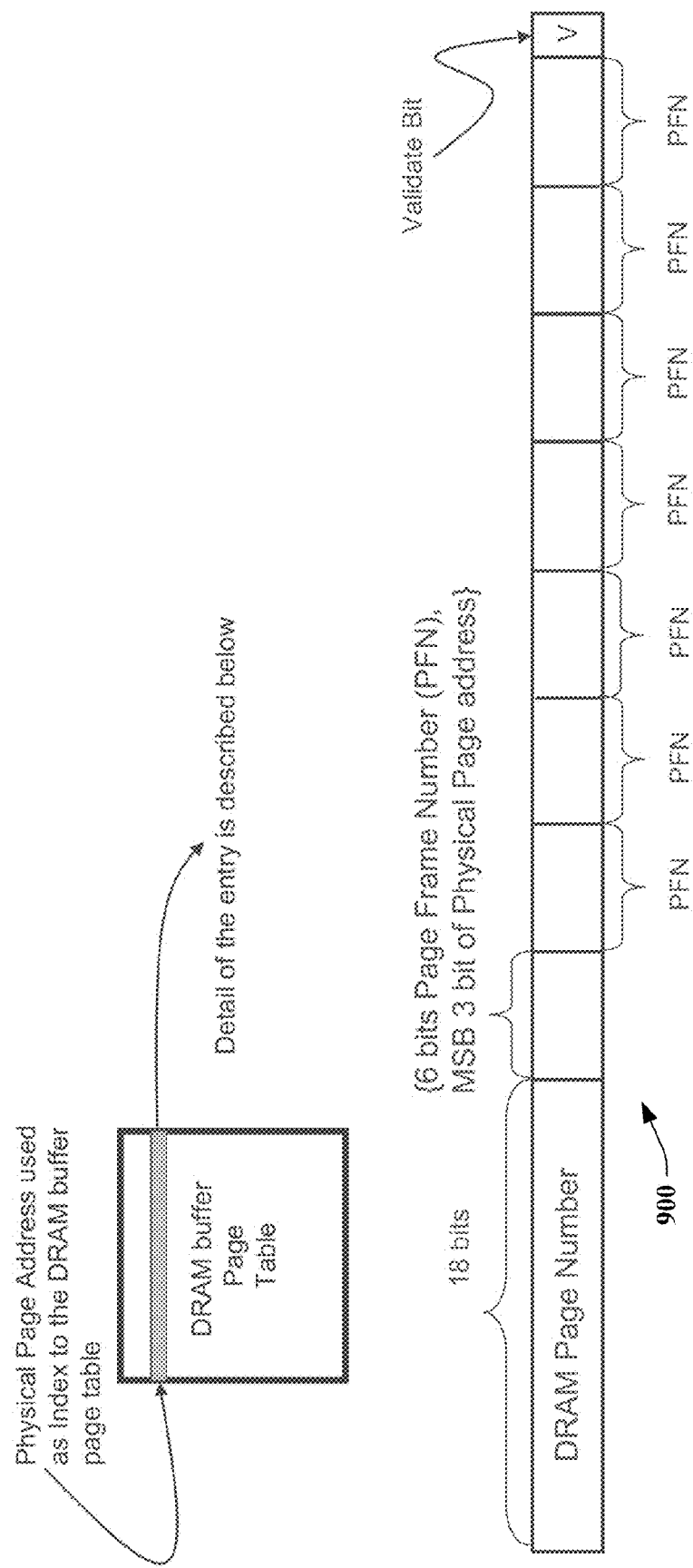

FIGS. 8 and 9 illustrate example address and page table formats. With respect to FIG. 8, an example physical address 800 can include a page frame number, a physical page address, and a page offset, where differing numbers of bits are available for the respective address fields depending on the desired memory size. With respect to FIG. 9, a DRAM buffer page table entry is shown at 900. This can include a page number along with corresponding page frame numbers which provide portions of a physical address. This can also include one or more data valid bits.

Figure 10:
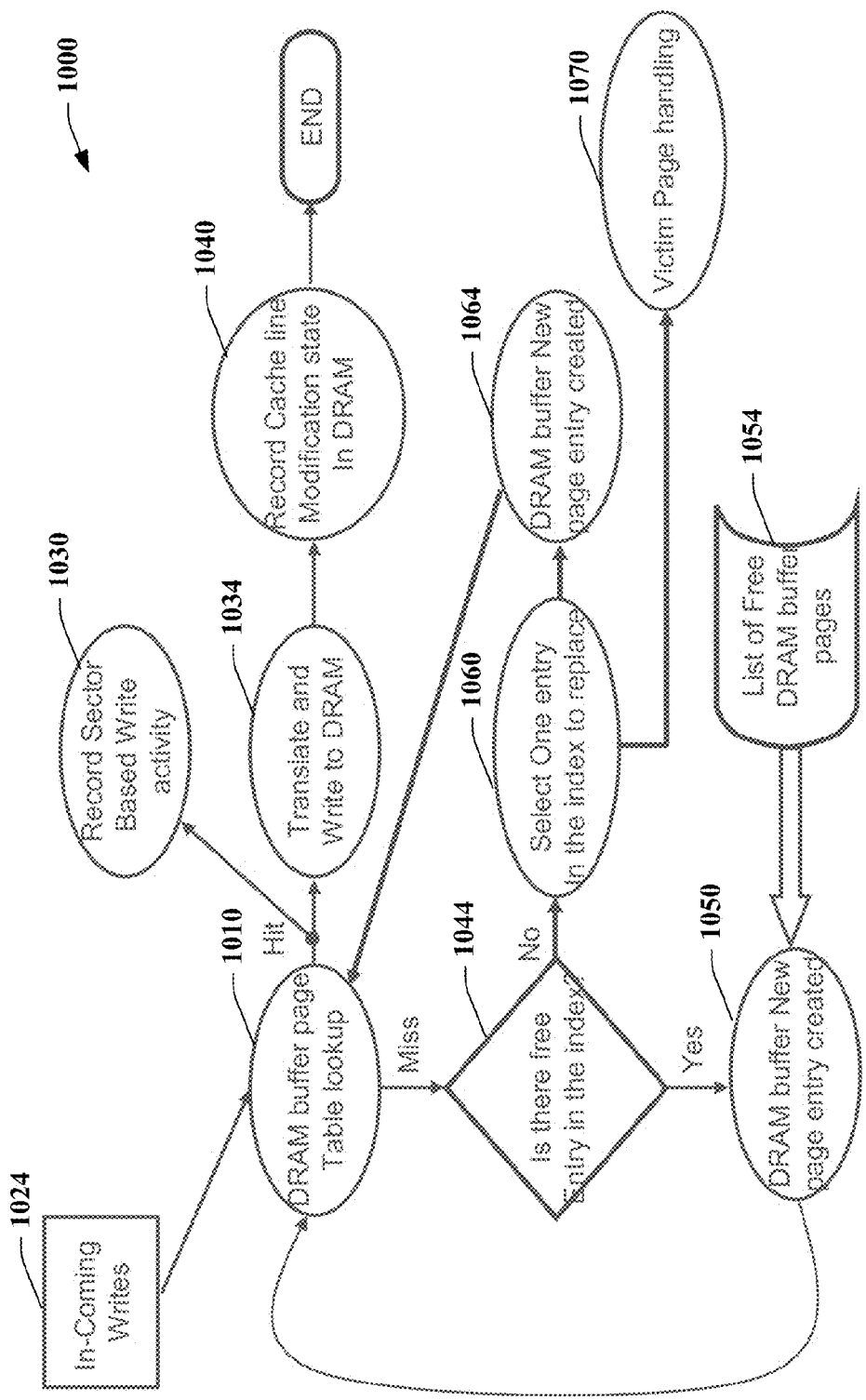
FIG. 10 illustrates an example DRAM write handling process.

Turning to FIG. 10, an example DRAM write handling process is illustrated. A DRAM buffer table look up is performed at 1010 and receives data from incoming writes 1024. After a page table hit occurs, record sector based write activity at and translate and write to DRAM at 1034. Record cache line modification state in DRAM at 1040 before ending the process. If a table lookup miss occurs at 1010, determine if there is a free entry in an index at 1044. If so, then a new DRAM buffer page is created at 1050 from a list of free DRAM buffer pages at 1054. If there is no free index at 1044, the process selects one entry in the index to replace at 1060. and updates the DRAM buffer with a new page entry at 1064. This also spawns a process for victim page handling at 1070 which is described in more detail below.

Figure 11:
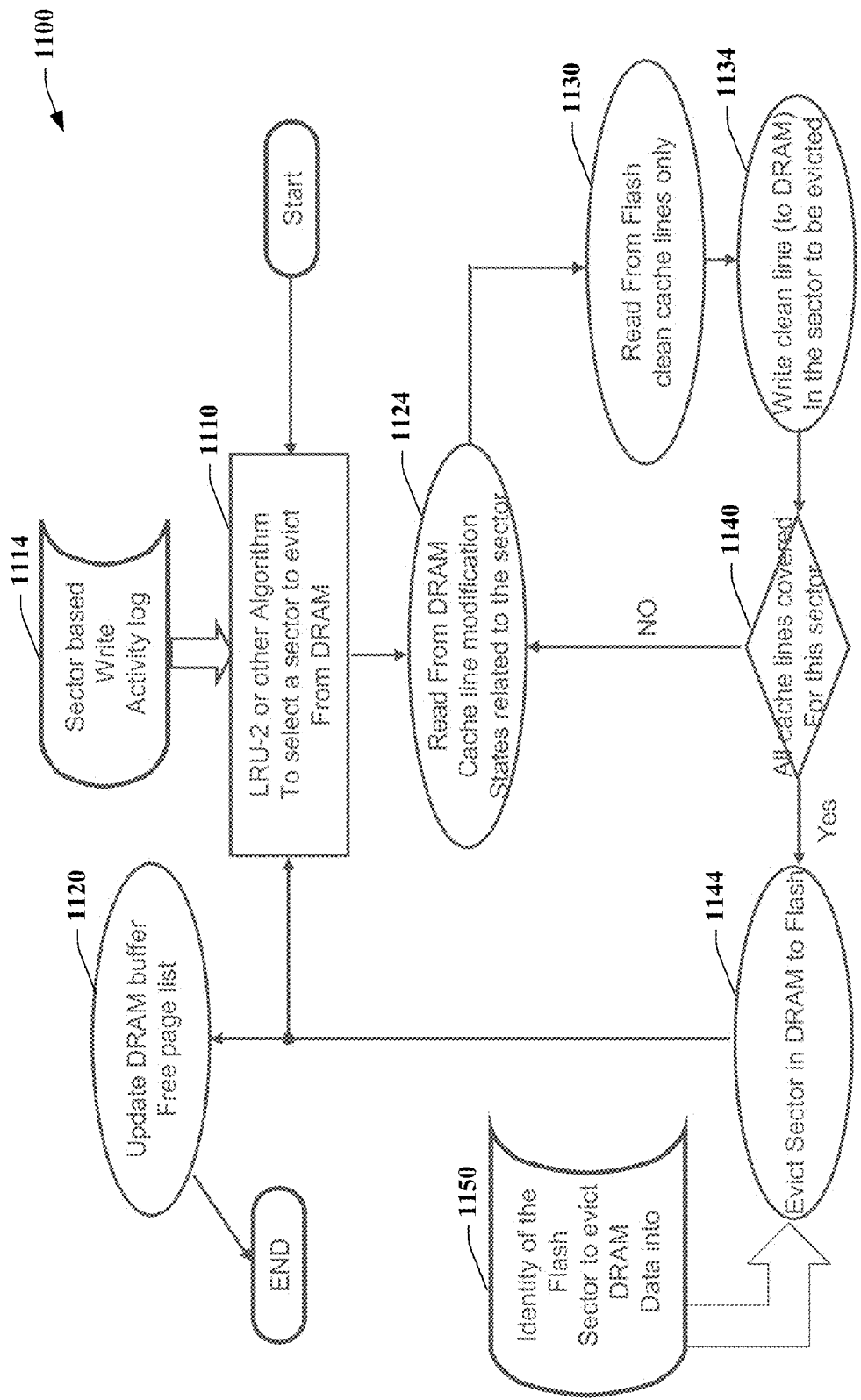
FIG. 11 depicts an example process for evicting data from DRAM to FLASH.

FIG. 11 depicts an example process 1100 for evicting data from DRAM to FLASH. In general, a victim page handling mechanism (or component) can be provided where the mechanism starts when a conflict miss took place in the DRAM buffer table. One data set is generally selected to be replaced. Use a buffer in DRAM for the incoming write data while evicting the sector chosen. Copy from the to the designated DRAM location when the eviction is complete, where there may be a need to throttle or slow down back the writes if the designated buffer area is close to depletion. At 1110, an LRU-2 or other algorithm is employed to select a sector to evict from DRAM. The component 1110 receives data from a sector based write activity log 114 and/or from a free page list 1120. A read from DRAM cache line modification states relating to the sector is performed at 1124. A read from FLASH occurs at 1130 and a write of clean cache lines to DRAM occurs at 1134. A decision occurs at 1140 to determine if the cache lines have been covered for a sector. If not, the process proceeds back to 1124. If the cache lines have been covered at 1140, the process performs an evict sector to FLASH at 1144. The evict sector 1144 receives data at 1150 about the identity of the FLASH sector to evict.

Figure 12:
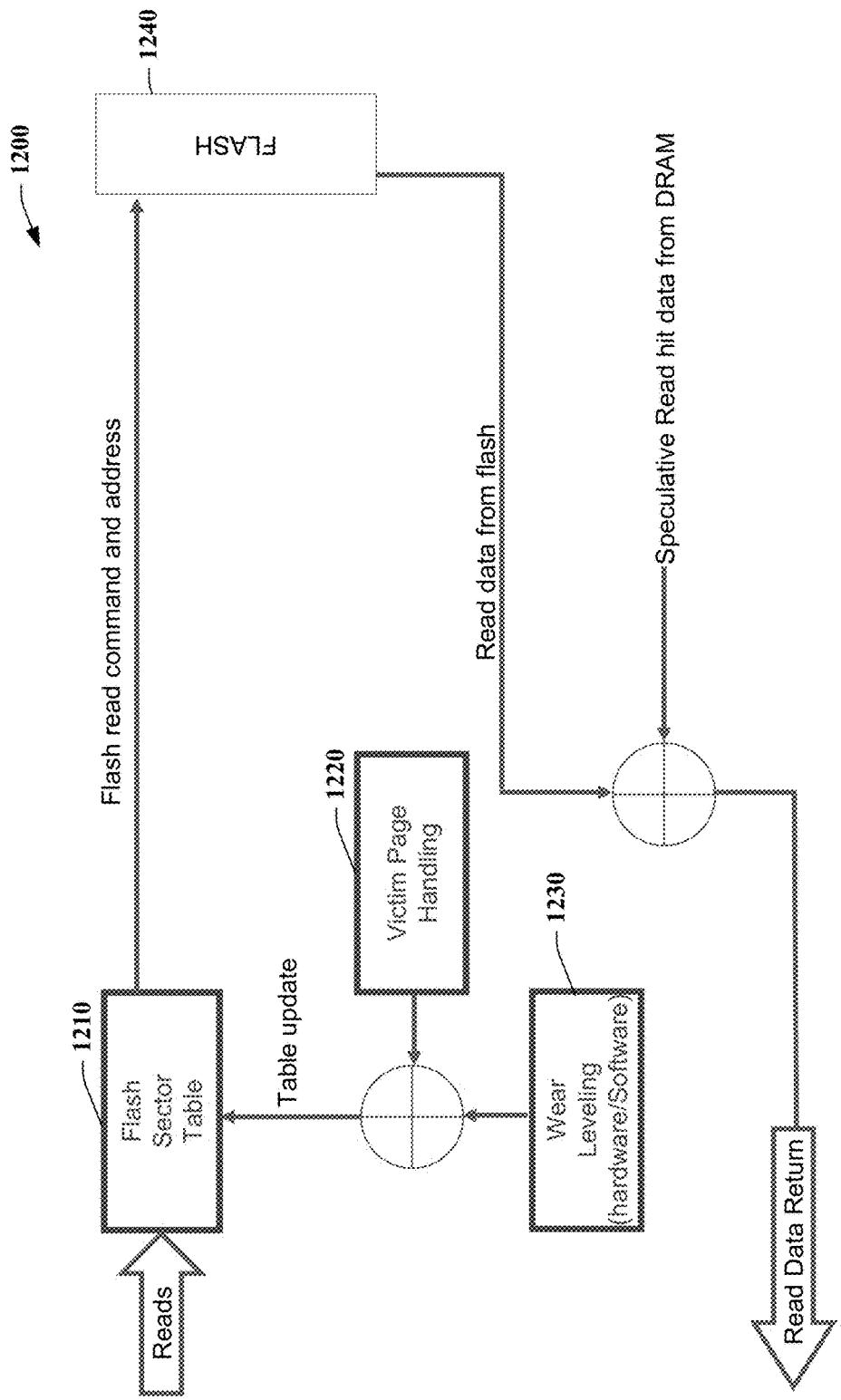
FIG. 12 illustrates an example flash management block diagram.
Figure 13:
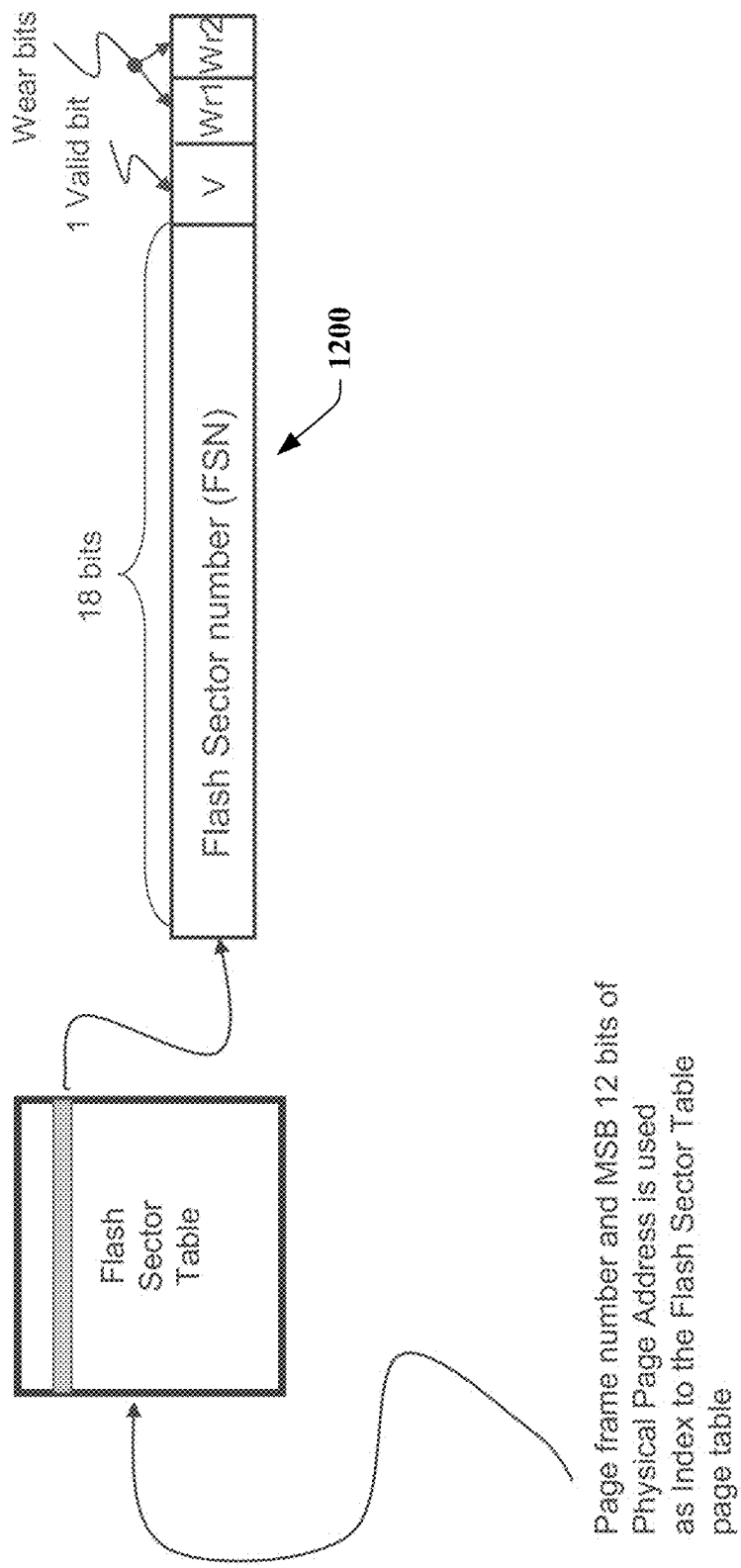
FIG. 13 illustrates an example flash sector table entry format.

FIG. 12 illustrates an example flash management system 1200. The system includes a FLASH sector table 1210, victim page handling component 1220, and a wear leveling component 1230 that are collectively employed to manage one or more DIMM FLASH modules 1240. The ASIC Flash sector table 1210 supports a total of 256 GB of flash memory but other memory sizes can be employed. It is of 256 k sector translation entries. Each entry typically represents a 1 MB sector. The wear leveling component 1230 is used to identify the flash sector to move DRAM data into. Wear leveling can be provided as hardware or software of a combination of both. FIG. 13 illustrates an example flash sector table entry format 1300. The format can include a flash sector number, data valid bits, and one or more wear bits.

Figure 14:
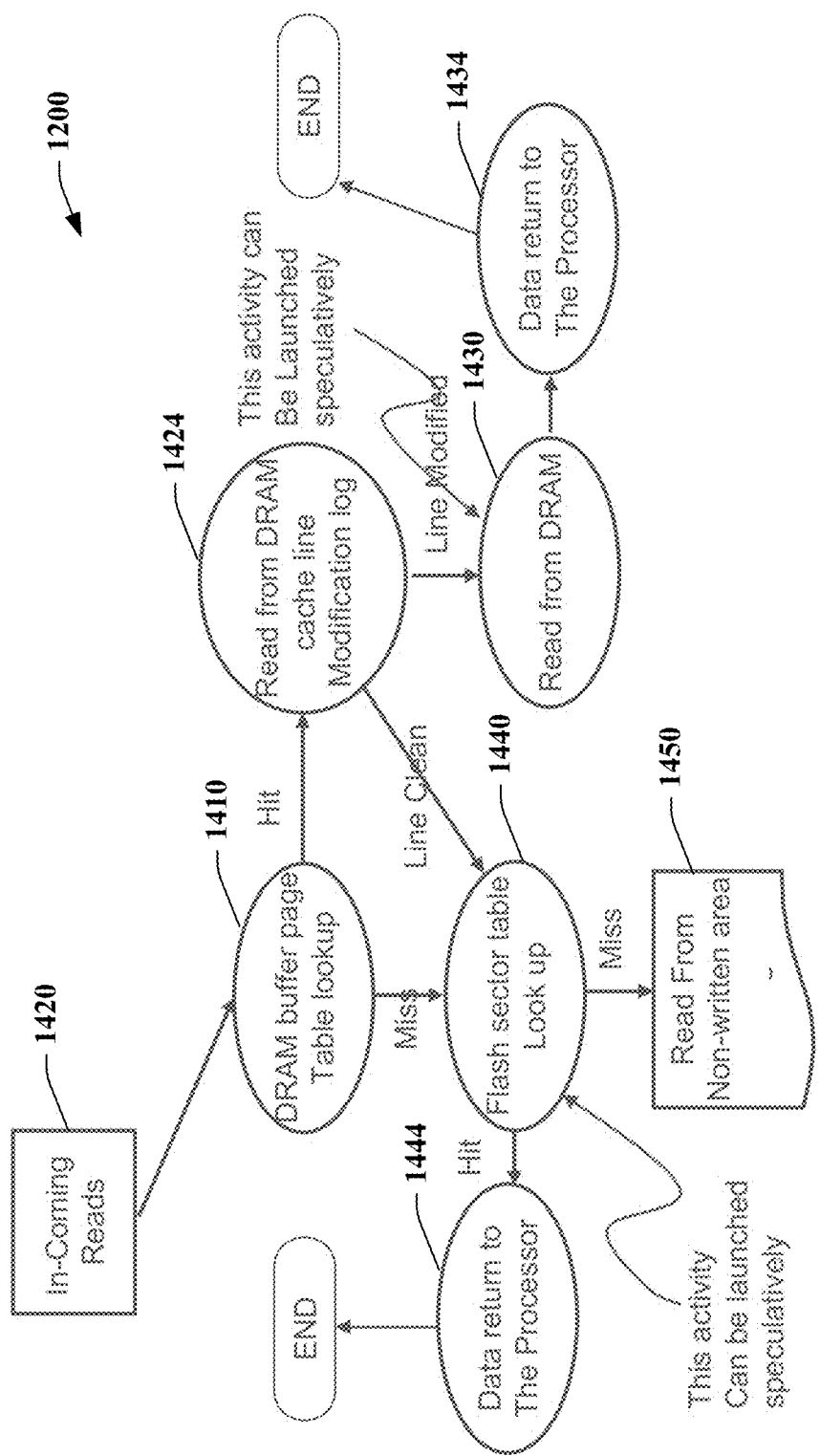
FIG. 14 illustrates an example read path flow diagram.

Turning to FIG. 14, an example read path flow process 1400 is illustrated. A DRAM buffer lookup is performed at 1410 in view of incoming read requests 1420. If a page hit occurs, read from DRAM cache line modification log at 1424, read from DRAM at 1430 return data to processor at 1434. If a miss occurs at 1410, perform flash table lookup at 1440. If a hit occurs in the FLASH table, return data to the processor at 1444, otherwise read FLASH contents from the non-written area of FLASH at 1450.

Figure 15:
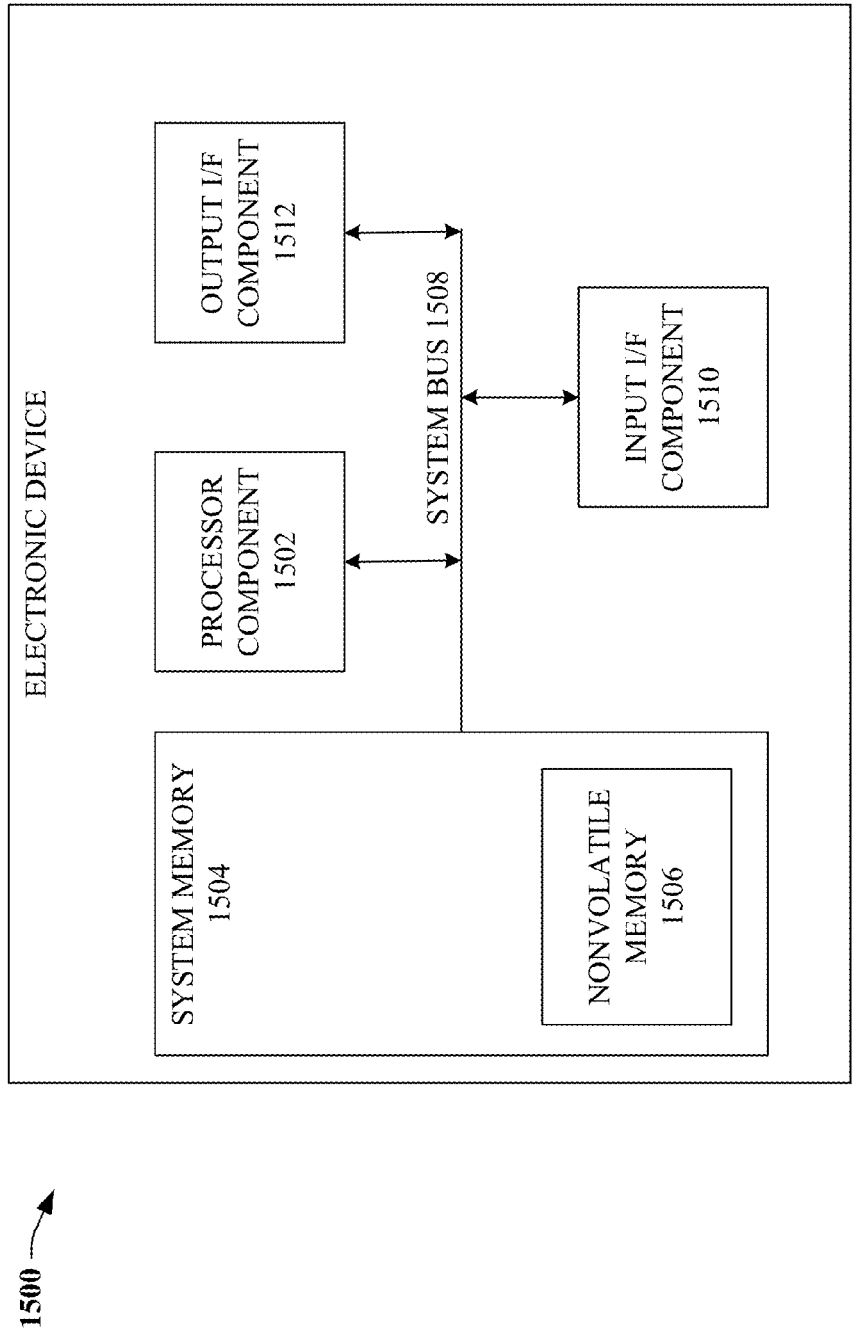
FIG. 15 illustrates an example of an electronic device that can be associated with a memory.

Referring to FIG. 15, a block diagram illustrates an exemplary, non-limiting electronic device 1500 that can comprise and/or incorporate the systems or components previously described. The electronic device 1500 can include, but is not limited to, a computer, a laptop computer, network equipment (e.g., routers, access points), a media player and/or recorder (e.g., audio player and/or recorder, video player and/or recorder), a television, a smart card, a phone, a cellular phone, a smart phone, an electronic organizer, a PDA, a portable email reader, a digital camera, an electronic game (e.g., video game), an electronic device associated with digital rights management, a Personal Computer Memory Card International Association (PCMCIA) card, a trusted platform module (TPM), a Hardware Security Module (HSM), set-top boxes, a digital video recorder, a gaming console, a navigation system or device (e.g., global position satellite (GPS) system), a secure memory device with computational capabilities, a device with a tamper-resistant chip(s), an electronic device associated with an industrial control system, an embedded computer in a machine (e.g., an airplane, a copier, a motor vehicle, a microwave oven), and the like.

Components of the electronic device 1500 can include, but are not limited to, a processor component 1502 (e.g., which can be and/or can include the same or similar functionality as processor component 302, as depicted in FIG. 3 and described herein), a system memory 1504, which can contain a nonvolatile memory 1506, and a system bus 1508 that can couple various system components including the system memory 1504 to the processor component 1502. The system bus 1508 can be any of several types of bus structures including a memory bus or memory controller, a peripheral bus, or a local bus using any of a variety of bus architectures.

Electronic device 1500 can typically include a variety of computer readable media. Computer readable media can be any available media that can be accessed by the electronic device 1500. By way of example, and not limitation, computer readable media can comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, nonvolatile memory 1506 (e.g., flash memory), or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by electronic device 1500. Communication media typically embodies computer readable instructions, data structures, program modules or other data in a modulated data signal such as a carrier wave or other transport mechanism and includes any information delivery media.

The system memory 1504 can include computer storage media in the form of volatile (e.g., SRAM) and/or nonvolatile memory 1506 (e.g., flash memory). For example, nonvolatile memory 1506 can be the same or similar, or can contain the same or similar functionality, as memory component 1502. A basic input/output system (BIOS), containing the basic routines that can facilitate transferring information between elements within electronic device 1500, such as during start-up, can be stored in the system memory 1504. The system memory 1504 typically also can contain data and/or program modules that can be accessible to and/or presently be operated on by the processor component 1502. By way of example, and not limitation, the system memory 1504 can also include an operating system(s), application programs, other program modules, and program data.

The nonvolatile memory 1506 can be removable or non-removable. For example, the nonvolatile memory 1506 can be in the form of a removable memory card or a USB flash drive. In accordance with one aspect, the nonvolatile memory 1506 can include flash memory (e.g., single-bit flash memory, multi-bit flash memory), ROM, PROM, EPROM, EEPROM, or NVRAM (e.g., FeRAM), or a combination thereof, for example. Further, a flash memory can comprise NOR flash memory and/or NAND flash memory. In accordance with another aspect, the nonvolatile memory 1506 can comprise one or more memory components.

A user can enter commands and information into the electronic device 1100 through input devices (not shown) such as a keypad, microphone, tablet, or touch screen although other input devices can also be utilized. These and other input devices can be connected to the processor component 1502 through input interface component 1510 that can be connected to the system bus 1508. Other interface and bus structures, such as a parallel port, game port or a universal serial bus (USB) can also be utilized. A graphics subsystem (not shown) can also be connected to the system bus 1508. A display device (not shown) can be also connected to the system bus 1508 via an interface, such as output interface component 1512, which can in turn communicate with video memory. In addition to a display, the electronic device 1500 can also include other peripheral output devices such as speakers (not shown), which can be connected through output interface component 1512.

It is to be understood and appreciated that the computer-implemented programs and software can be implemented within a standard computer architecture. While some aspects of the disclosure have been described above in the general context of computer-executable instructions that can be run on one or more computers, those skilled in the art will recognize that the technology also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, phone), microprocessor-based or programmable consumer electronics, and the like, each of which can be operatively coupled to one or more associated devices.

The illustrated aspects of the disclosure may also be practiced in distributed computing environments where certain tasks are performed by remote processing devices that are linked through a communications network. In a distributed computing environment, program modules can be located in both local and remote memory storage devices.

It is also to be understood and appreciated that cryptographic protocols can be employed to facilitate security of data associated with a memory (e.g., memory component 102) in accordance with the disclosed subject matter. For example, a cryptographic component (e.g., cryptographic engine) can be employed and can facilitate encrypting and/or decrypting data to facilitate securing data being written to, stored in, and/or read from the memory. The cryptographic component can provide symmetric cryptographic tools and accelerators (e.g., Twofish, Blowfish, AES, TDES, IDEA, CASTS, RC4, etc.) to facilitate data security. The cryptographic component can also provide asymmetric cryptographic accelerators and tools (e.g., RSA, Digital Signature Standard (DSS), and the like) to facilitate securing data. Additionally, the cryptographic component can provide accelerators and tools (e.g., Secure Hash Algorithm (SHA) and its variants such as, for example, SHA-0, SHA-1, SHA-224, SHA-256, SHA-384, and SHA-512) to facilitate data security.

It is to be appreciated and understood that authentication protocols can be employed to facilitate security of data associated with the memory (e.g., memory component 102) in accordance with the disclosed subject matter. For example, an authentication component can solicit authentication data from an entity, and, upon the authentication data so solicited, can be employed, individually and/or in conjunction with information acquired and ascertained as a result of biometric modalities employed, to facilitate control access to the memory. The authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), and the like, for example. Additionally and/or alternatively, public key infrastructure (PKI) data can also be employed by the authentication component. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

The authentication component can implement one or more machine-implemented techniques to identify an entity by its unique physical and behavioral characteristics and attributes. Biometric modalities that can be employed can include, for example, face recognition wherein measurements of key points on an entity's face can provide a unique pattern that can be associated with the entity, iris recognition that measures from the outer edge towards the pupil the patterns associated with the colored part of the eye—the iris—to detect unique features associated with an entity's iris, and finger print identification that scans the corrugated ridges of skin that are non-continuous and form a pattern that can provide distinguishing features to identify an entity.

As utilized herein, terms "component," "system," "interface," and the like, are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system, comprising:
a controller component configured to regulate read and write access to a flash memory component and a buffer memory component, wherein the controller component is configured to control a transfer of a set of data associated with an application between the flash memory component and the buffer memory component in connection with a write operation related to the application based on a defined bursting behavior criterion or a defined bandwidth criterion and wherein the buffer memory component is only visible to the controller component; and
a partial allocate component configured to partially allocate the set of data stored in the flash memory component into a working set of the set of data associated with the application that is subject to the write operation and to facilitate storage of write data in the flash memory component, wherein the working set is copied from the flash memory component to the buffer memory component to facilitate an update of the working set in the buffer memory component to updated data based on the write data and the buffer memory component is sized as a function of a change rate of the working set being less than a change rate of an update rate to the flash memory component.

2. The system of claim 1, wherein the buffer memory component is configured to cache the updated data in the buffer memory component for a defined period of time before the updated data is transferred to the flash memory component to facilitate mitigation of a data bursting behavior associated with the application.

3. The system of claim 1, wherein the buffer memory component is configured to receive the write data at a first data communication rate, cache the write data or the updated data in the buffer memory component, and transfer the updated data from the buffer memory component to the flash memory component at a second data communication rate associated with the flash memory component, wherein the first data rate is higher than the second data rate.

4. The system of claim 1, wherein the controller component facilitates the update of the working set in the buffer memory component with the write data relating to the application to generate the updated data.

5. The system of claim 1, wherein, during a read operation to read the updated data, the controller component facilitates a read of the updated data from the buffer memory component.

6. The system of claim 1, wherein the controller component is configured as an application specific integrated circuit that occupies an expansion memory slot of a computer, the controller component is configured to operate a data transfer component to transfer data from the buffer memory component to the flash memory component.

7. The system of claim 1, comprising a page table configured to facilitate transferring data between the buffer memory component and the flash memory component.

8. The system of claim 1, wherein the set of data is updated to a set of modified data based on the working set being updated to the updated data based on the write data, and wherein the controller component is further configured to enable the application to facilitate a transfer of the write data to the buffer memory component and to facilitate a read of the set of modified data via a read of the updated data from the buffer memory.

9. The system of claim 8, further comprising an eviction control component configured to determine whether a page of data is to be evicted from the buffer memory component and transferred to the flash memory component.

10. The system of claim 1, further comprising a sector data merge control component configured to facilitate a background data transfer of the updated data from the buffer memory component to the flash memory component.

11. A method, comprising:
partially allocating a set of data associated with an application stored in a flash memory into a working set of the set of data associated with the application that is to be updated by a write operation with write data;
facilitating storage of the write data in the flash memory, wherein the working set is copied from the flash memory to a buffer memory to facilitate an update of the working set in the buffer memory to updated data based on the write data;
regulating a read access and a write access to the flash memory and the buffer memory; and
controlling transfer of the set of data associated with the application between the flash memory in connection with the write operation related to the application as a function of a defined bursting behavior criterion or a bandwidth criterion,
wherein a size of the buffer memory is based on a determination that a rate of change of the working set is less than a rate of change of an update rate to the flash memory.

12. The method of claim 11, comprising:
receiving the write data by the buffer component at a first data communication rate associated with the application;
updating the working set with the write data to produce the updated data; and
transferring the updated data to the flash memory at a second data communication rate associated with the flash memory, wherein the first data communication rate is higher than the second data communication rate.

13. The method of claim 11, comprising:
reading the updated data associated with the application from the buffer component in connection with a read associated with the application.

14. The method of claim 11, further comprising:
determining whether a page of data is to be transferred from the buffer component and to the flash memory based on a set of page information.

15. A system, comprising:
a controller component configured to regulate a read access and a write access to a flash memory component-that stores a set of data associated with an application and a volatile memory component and control a transfer of the set of data between the flash memory component and the volatile memory component in connection with a memory manager function related to the application based on a defined bursting behavior criterion or a defined bandwidth criterion; and
a partial allocate component configured to partially allocate the set of data into a working set that is to be updated with write data and is associated with the application, copy the working set from the flash memory component and store the working set in a volatile buffer component to facilitate an update of the working set with the write data associated with the application to produce updated data, wherein the volatile buffer component is only visible to the controller component, and the volatile buffer component is sized as a function of a change of an update rate to the flash memory component being greater than a change rate of the working set.

16. The system of claim 15, wherein the controller component facilitates a read of the updated data from the volatile buffer component concurrently with a read associated with the application.

17. The system of claim 15, wherein the volatile buffer component caches the write data, the working set, or updated data in the volatile buffer component before the updated data is transferred to the flash memory component to facilitate management of writing the write data to the flash memory component in data bursts at a first data write communication rate associated with the application that is higher than a second data write communication rate associated with the flash memory component.

18. The system of claim 15, wherein the controller component facilitates the update of the, working set or the transfer of updates to data from the volatile buffer component to the flash memory component based on the defined bursting behavior criterion or the defined bandwidth criterion relating to the application or the flash memory component.

19. The system of claim 15, wherein the partial allocate component facilitates a reduction in a number of read and write cycles on a system bus in connection with the set of data by retaining data in the flash memory component and not transferring the data to the volatile buffer component in connection with the write operation.

20. The system of claim 15, further comprises a data transfer component that transfers the updated data from the volatile buffer component to the flash memory component in response to determining that the updated data is not being used.

* * * * *